(12) United States Patent
Wang (10) Patent No.: US 7,614,047 B1
(45) Date of Patent: Nov. 3, 2009

(54) CHANGE INDICATION FOR A SERVICE OFFERING

(75) Inventor: Wei-Lung Wang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/196,150

(22) Filed: Aug. 21, 2008

(51) Int. Cl.
 G06F 9/44 (2006.01)
 G06F 15/16 (2006.01)
 H04L 9/32 (2006.01)

(52) U.S. Cl. .............. 717/170; 717/171; 717/172; 709/203; 713/178; 713/179; 713/180

(58) Field of Classification Search .............. None
See application file for complete search history.

(56) References Cited

U.S. PATENT DOCUMENTS

| | | | |
|---|---|---|---|
| 4,802,116 A * | 1/1989 | Ward et al. ............. | 703/23 |
| 5,390,328 A * | 2/1995 | Frey et al. ............. | 719/315 |
| 5,410,684 A * | 4/1995 | Ainsworth et al. ....... | 714/18 |
| 5,691,917 A * | 11/1997 | Harrison ............... | 717/127 |
| 5,832,517 A * | 11/1998 | Knutsen, II ............ | 707/202 |
| 6,119,173 A * | 9/2000 | Pullen et al. ........... | 719/328 |
| 6,457,136 B1 * | 9/2002 | Sugiura ................ | 713/340 |
| 6,741,174 B2 * | 5/2004 | Rhoades et al. ......... | 340/540 |
| 6,831,555 B1 * | 12/2004 | Miller et al. ........... | 340/506 |
| 7,194,659 B2 * | 3/2007 | Buchanan et al. ........ | 714/36 |
| 7,464,126 B2 * | 12/2008 | Chen ................... | 707/204 |
| 2002/0116480 A1 * | 8/2002 | Muto .................. | 709/220 |
| 2003/0093678 A1 * | 5/2003 | Bowe et al. ............ | 713/180 |
| 2006/0088060 A1 * | 4/2006 | Fujikami et al. ........ | 370/474 |
| 2007/0094672 A1 * | 4/2007 | Hayton et al. .......... | 719/315 |
| 2007/0143407 A1 | 6/2007 | Avritch et al. | |
| 2007/0271385 A1 * | 11/2007 | Davis et al. ........... | 709/228 |
| 2007/0294399 A1 * | 12/2007 | Grossner et al. ........ | 709/224 |
| 2008/0104569 A1 * | 5/2008 | Gilfix et al. ........... | 717/104 |
| 2008/0151771 A1 * | 6/2008 | Dowse ................ | 370/252 |
| 2008/0208982 A1 * | 8/2008 | Morris ................ | 709/206 |
| 2008/0209438 A1 * | 8/2008 | Jackson et al. ......... | 719/313 |
| 2008/0229328 A1 * | 9/2008 | Branigan et al. ........ | 719/313 |
| 2008/0243725 A1 * | 10/2008 | Homan-Muise et al. .... | 705/400 |
| 2008/0247320 A1 * | 10/2008 | Grah et al. ............ | 370/241 |
| 2009/0070783 A1 * | 3/2009 | Schmidt et al. ......... | 719/318 |
| 2009/0070784 A1 * | 3/2009 | Schmidt et al. ......... | 719/318 |
| 2009/0083759 A1 * | 3/2009 | Keil et al. ............. | 719/313 |

(Continued)

OTHER PUBLICATIONS

Mike Chaple, CISSP Introduction to SNMPv3's security functinality, published Apr. 11, 2005, pp. 1-3, [retrieved on Jun. 10, 2009]. Retrieved from the Internet:<URL: http:///www.searchsecurityasia.com/print/4571>.*

Primary Examiner—Tuan Q Dam
Assistant Examiner—Zheng Wei
(74) Attorney, Agent, or Firm—Yee & Associates, P.C.; Ronald A. Kaschak (57) ABSTRACT

Illustrative embodiments provide a computer-implemented method for indicating a change in a service offering. The computer-implemented method generates a token representative of a state of the service offering, and determines whether the service offering has been modified to form a modified service. Responsive to a determination that the service offering has been modified, generates a token representative of the state of the modified service, and determines whether the service offering has been restarted to form a restarted service. Responsive to a determination that the offered service has been restarted, generates a token representative of the state of the restarted service, and provides the token to a requester.

1 Claim, 3 Drawing Sheets

U.S. PATENT DOCUMENTS

2009/0089741 A1* 4/2009 Bornhoevd et al. ......... 717/106
2009/0132708 A1* 5/2009 Hayward .................... 709/226
2009/0144755 A1* 6/2009 Coatney et al. ............. 719/318

* cited by examiner

CHANGE INDICATION FOR A SERVICE OFFERING

BACKGROUND OF THE INVENTION

1. Field of the Invention

The present invention relates, generally, to an improved data processing system and, more specifically, to a computer-implemented method for indicating a change in a service offering.

2. Description of the Related Art

A service-oriented architecture (SOA) allows applications and users to consume services provided by different parties. The consumption takes place in a loosely-coupled fashion, in which a binding between a service consumer and a service provider is through a service contract that a service provider advertises. The contract may be in the form of a web service definition language (WSDL, a specification for describing network services available from www.w3.org/TR/wsdl) file. Business users can support new business functions by orchestrating the use of services that have been provided by other parties.

An enterprise that implements a service-oriented architecture service may then provide services that might be reused, allowing new business processes to be implemented more easily.

However, a service-oriented architecture might also present governance issues, such as when service consumers need to know when any of the services being used have been changed. Some of the changes may be planned, such as version upgrades of the software providing the service. If these changes are properly communicated to service consumers, then it is possible for the service consumer to understand and react to those changes. Problems might occur when changes are not planned, or not accurately communicated to service consumers.

Scenarios where unplanned changes occur, or when changes are not accurately communicated to service consumers, might include when a new version of the software application has been loaded, and the version field in the service's web service definition language file is not accurately updated. Another example might be when a user or component has accidentally or deliberately overwritten the application with an incorrect version of the application. In yet another example, one of the resources used by the application has changed, causing the application (and the service it provides) to behave differently and possibly cause an unplanned change. For example, a Java EE Connector Architecture (JCA), (a generic, Java-based mechanism for connecting application servers and enterprise information systems (EIS) in an enterprise application integration (EAI) scenario) adapter used to connect to an enterprise requirement and planning system may have been downgraded to an older version. The downgrade may cause the application to retrieve a different set of values from the system than expected, and therefore deliver different data to service consumers.

Service consumers may also want to know when an application providing the service, or the server hosting the service, has been reset. The information might be useful in troubleshooting services, which may behave differently after an application or a server restart. This information is also useful in forensic investigations to investigate any irregularities in the service providers.

Previous solutions have attempted to declare changes to a service by publishing the service version number in the service's web service definition language file. The approaches focus on changes in declared service functionality and require developers or administrators to explicitly declare when new versions of a service are being provided. The current approaches rely on the developers and administrators and might have difficulty with timely updates, due to unintended changes or malicious attempts to change applications.

BRIEF SUMMARY OF THE INVENTION

According to one embodiment of the present invention, a computer-implemented method for indicating a change in a service offering is provided. The computer-implemented method generates a token representative of a state of the service offering and determines whether the service offering has been modified to form a modified service. Responsive to a determination that the service offering has been modified, generates a token representative of the state of the modified service, and determines whether the service offering has been restarted to form a restarted service. Responsive to a determination that the offered service has been restarted, generates a token representative of the state of the restarted service, and provides the token to a requester.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process, such that the instructions which execute on the computer, or other programmable apparatus, provide processes for implementing the functions/acts specified in the flowchart and/or block diagram block or blocks.

Figure 1:
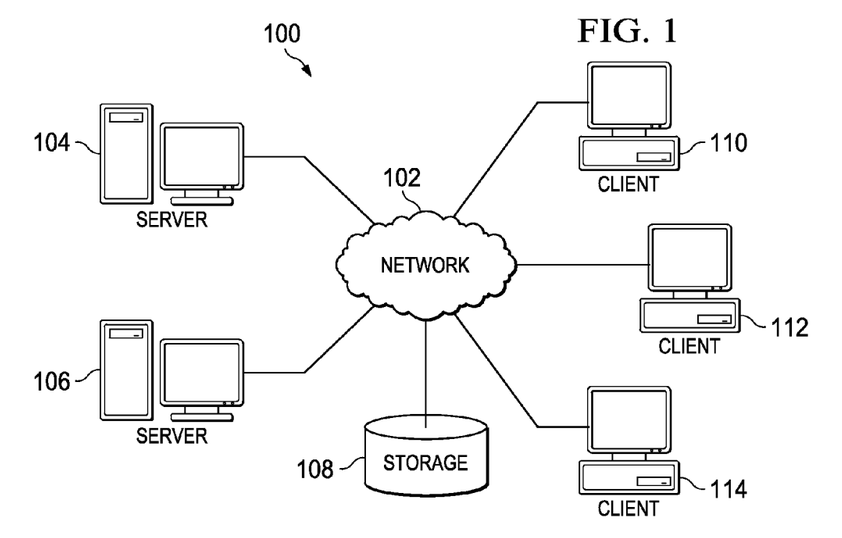
FIG. 1 depicts a pictorial representation of a network of data processing system, in which illustrative embodiments may be implemented.
Figure 2:
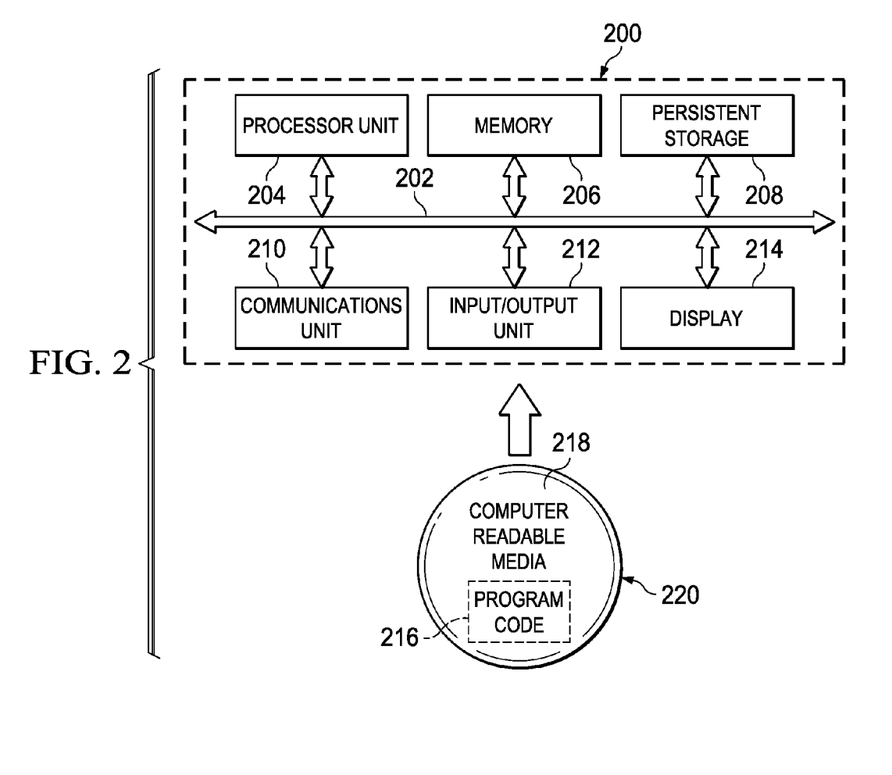
FIG. 2 is a block diagram of a data processing system, in which illustrative embodiments may be implemented.

With reference now to the figures, and in particular with reference to FIGS. 1-2, exemplary diagrams of data processing environments are provided, in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system, in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

With reference to system 100 of FIG. 1, in a service exchange across network 102 between a service requester on client 110 and a service provider on server 104, an instance-token may be exchanged. The instance-token may also be referred to simply as "the token." The service provider generates the instance-token for each application running on server 104. The instance-token is unique for a particular set of application code and resources used in producing a service. The instance-token is forwarded from the service provider on server 104 through network 102 to the service requester on client 110. The instance-token allows the service requester to determine whether the service may behave differently than before, in a prior service invocation. The instance-token provides a capability to determine whether a server or application restart occurred, whether a new version of application code has been loaded, and whether one of the resources used has changed.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems, in which a main processor is present, with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information, either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system, applications, or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system, including components in addition to, or in place of, those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
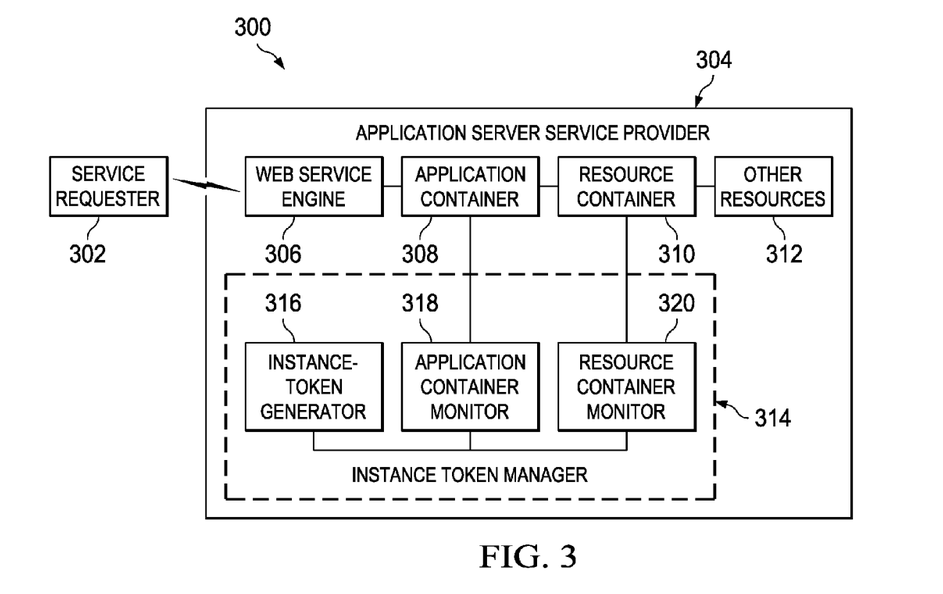
FIG. 3 is a block diagram of components of an instance-token manager, in accordance with illustrative embodiments.

With reference to FIG. 3, a block diagram of components of an instance-token manager, in accordance with illustrative embodiments is shown. Service-oriented architecture services are often produced by applications running within application servers. One illustrative embodiment is in the form of an application server as an example, and is not meant to be limited to an application server. Other implementations may be performed using other servers that generate services.

Application server systems typically contain a number of components comprising service requester 302, application server service provider 304, web service engine 306, application container 308, resource container 310 and other resources 312.

Within an application server, an implementation using instance-tokens may be embodied as software components that interact with various existing application server components. The software components of instance-token manager 314 comprise a number of components including instance-token generator 316, application container monitor 318, and resource container monitor 320.

Instance-token generator 316 contains code that generates an instance-token for use by the application server. Application server service provider 304 uses the instance-token when generating responses to service requesters that have contacted the application server regarding a service. The application server generates the tokens as a string of bytes. Each token is made up of bytes that represent a signature for each of the application code, the resources used, and the timestamp of the last startup of the application. Signatures can be generated using a variety of well-known hash algorithms, such as MD5 (Message-Digest algorithm 5, a widely used hash function with a 128-bit hash value, available as an Internet standard RFC 1321).

The signature of the application code is computed over the stream of bytes that comprise the compiled application code. Alternatively, a signature may be computed over any other string of bytes that can be reasonably expected to uniquely identify the particular unit of installed code. For example, the information base could be the timestamp of the application code files combined with the file size. Instance-token generator 316 obtains the information necessary for computing the signature from application container monitor 318.

In a similar manner, the signature of the resources in resource container 310 used by the application code is computed over the stream of bytes that comprise the resource adapter code. Alternatively, a resource signature may be computed over any other string of bytes that can be reasonably expected to uniquely identify all the resources used. For example, a combination of Java™ naming and directory interface (JNDI, part of the Java platform, providing applications based on Java a unified interface to multiple naming and directory services) names of the resources combined with the timestamp of the time the resource definitions were last modified. Instance-token generator 316 obtains the information necessary for computing the signature from resource container monitor 320.

Application container monitor 318 watches the application container to determine whether the application has been updated with new code. If an update occurs, application container monitor 318 obtains the new information required by instance-token generator 316 to compute a new signature of the application. Application container monitor 318 also keeps track of the time the application was last put into running mode (started). The time could have occurred when a system administrator explicitly started or restarted the application, or when the server experienced a system restart and subsequently re-started all applications automatically. When an application restart occurs, application container monitor 318 gathers the new restart date and time information which instance-token generator 316 requires in order to generate the timestamp required for the token.

Resource container monitor 320 keeps track of the resources used by the application. The resources used could be other web-services that the application calls, or resources such as resource adapters for connectivity that the application uses. When any of the resources have changed, resource container monitor 320 gathers the new information required for instance-token generator 316 to recalculate the signature of the resources. Other embodiments may also provide the same functions just described. Other resources 312 includes, but is not limited to databases, files, and other information resources used in the application.

Figure 4:
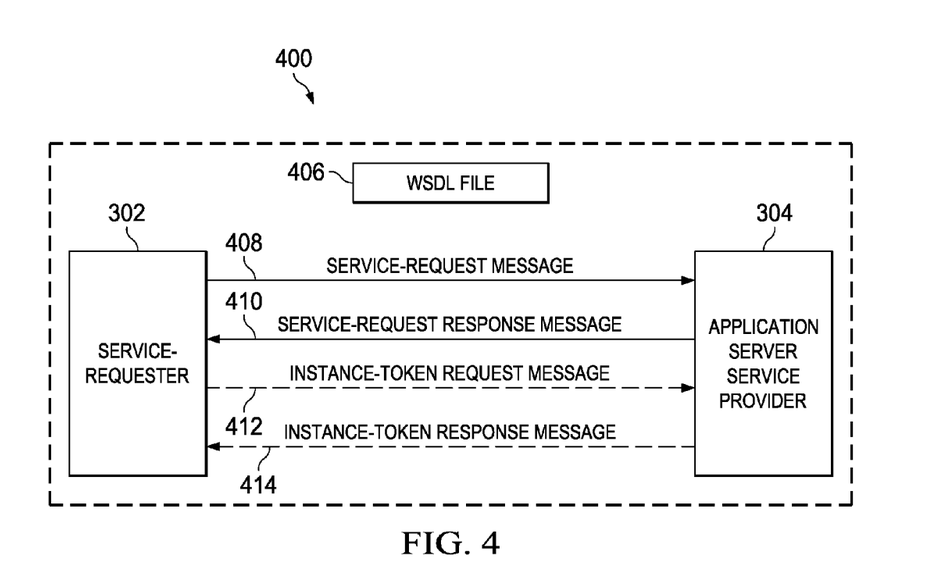
FIG. 4 is a block diagram of a message flow using instance-tokens, in accordance with illustrative embodiments.

With reference to FIG. 4, a block diagram of a message flow using instance-tokens, in accordance with illustrative embodiments is shown. There are typically two parties participating in a service-oriented architecture service invocation in the form of service requester 302 and application server service-provider 304 of FIG. 3. The two parties are usually implemented in the form of applications, and may also be referred to as the service-requesting application and the service-providing application, respectively. In the illustrated example there are three types of artifacts used in the course of service-oriented architecture service discovery and service invocation. The artifacts include a web service definition language file (WSDL) 406, service-request message 408, and service-request response message 410. The service request and response messages may be implemented over a variety of transport technologies, such as hypertext transport protocol, simple object access protocol (HTTP-SOAP, "soap" is now available from www.w3.org/TR/soap), or a Java-based messaging service.

The instance-token is used in communications between service-requester 302 and application server service-provider 304. The token can be made a part of service-request and response messages 408 and 410 flowing from application server service-provider 304 to service-requester 302, or a part of the web service definition language service definition files 406 that service-requesters read to determine if a service-provider is providing a service that is required.

In one example, developers who write service-requestor 302 applications may perform static binding to service-oriented architecture services. In this case, application server service-provider 304 has been identified before the service-requesting application starts executing. In this scenario, the instance-token can be provided to the service-requesting application either through web service definition language file 406 that is dynamically generated by the application server, as in that of service provider 304, or through a separate set of instance-token request/response messages 412 and 414 made from service-requester 302 to application server service-provider 304. The message exchange occurs after service-requester 302 has used the service's published web service definition language file 406 to ascertain the suitability of the services and location of application server service-provider 304.

Service-requester 302 is then able to store in memory, temporary or persistent, the instance-token of the service. At each service invocation, application server service-provider 304 sends the instance-token back to service-requester 302 as part of a normal service request response message 410, which may be formatted, in an appropriate protocol.

In one variation, during each service invocation, service-requester 302 may send a copy of the instance-token, obtained earlier, to application server service-provider 304 via service-request message 408 and request verification that the current instance-token is the same.

In either case, service-requester 302 may elect to make note of any changes to the instance-token compared to a value at the initial static binding, or over time as the service is repeatedly invoked. Using these mechanisms, service-requester 302 is able to determine if there is cause to believe that the service being provided may have changed since the first service binding, or has changed as compared to earlier service invocations. Service-requester 302 is able to use this information to troubleshoot when the service is not behaving as expected, or has changed its behavior over time.

In another scenario, developers who write service-requester 302 applications may perform dynamic binding to service-oriented architecture services. In this case, service-requester 302 looks for a application server service-provider 304 at runtime, just before invoking a particular service. Service-requester 302 may obtain the service instance-token either from web service definition language file 406 dynamically generated by application server service-provider 304, or through a separate set of instance-token request/response messages 412 and 414 designed to return a service instance-token.

Figure 5:
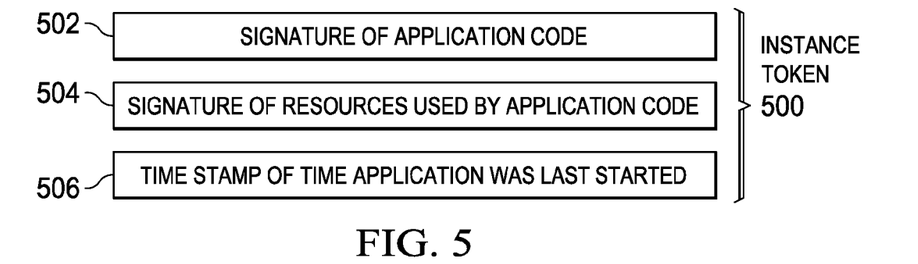
FIG. 5 is a block diagram of elements of an instance-token, in accordance with illustrative embodiments.

With reference to FIG. 5, a block diagram of elements of an instance-token, in accordance with illustrative embodiments is shown. Instance-token 500, generated by instance-token generator 316 of FIG. 3, contains a number of elements comprising signature of application code 502, signature of resources used by application code 504, and time stamp of time application was last started 506.

The three pieces of information provide the information required to determine whether the application or a resource changed, and when the last startup of the application occurred. Instance-token 500 is generated when a change in one of the monitored elements occurs and therefore, does not require a developer or administrator to determine when to update the value. Instance-token 500 does not describe an actual version number; rather the token represents a signature of the code. The signature therefore cannot tell which version of the code is being used; rather the signature provides a mechanism enabling a component to determine, based on a comparison with earlier calls to the service, if the application code has changed since the prior call.

Figure 6:
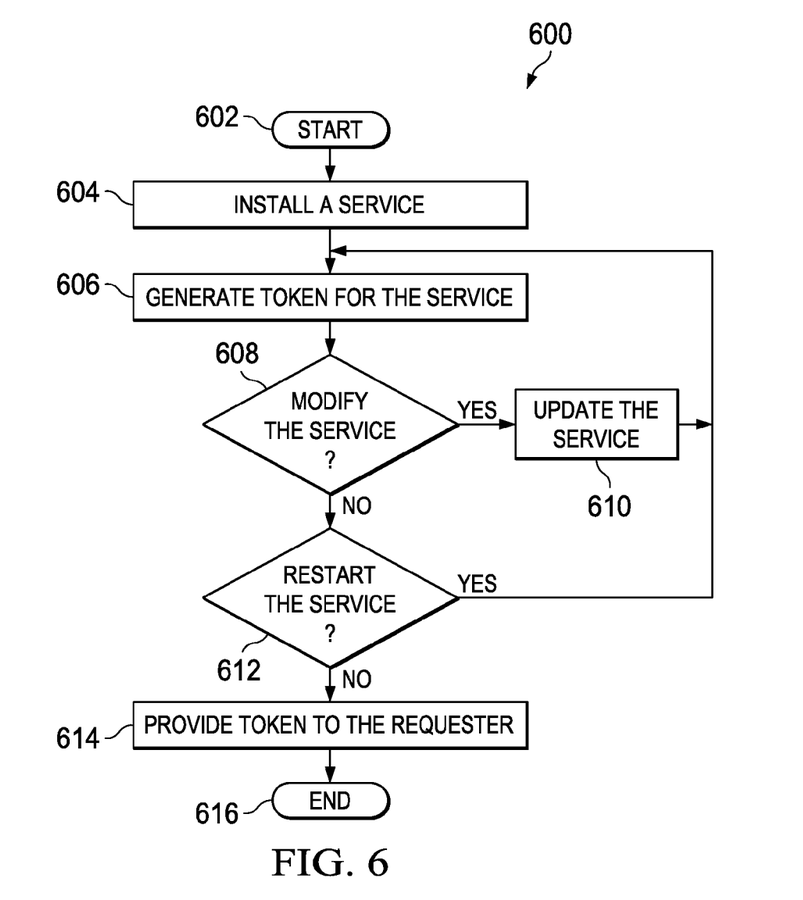
FIG. 6 is a flowchart of a process of the instance-token manager of FIG. 3, in accordance with illustrative embodiments.

With reference to FIG. 6, a flowchart of a process of the instance-token manager and application server service provider of FIG. 3, in accordance with illustrative embodiments, is shown. Process 600 is one example of use of instance-token manager 314 by application server service provider 304 of FIG. 3.

Process 600 starts (step 602) and installs a service (step 604). In this example, instance-token manager 314 is implemented within an application server. Generate token for the service (step 606) creates a first-instance-token based on the installation of the application. The installation determines whether to modify the service (step 608). When a service is to be modified, a "yes" response is obtained. When there is no need to change, a "no" is obtained. When a "yes" is obtained in step 608, update the service is performed (step 610) to cause the service to be changed. Process 600 then loops back to step 606 to generate a new, or second, instance-token for the service that changed.

A service change may comprise a software update to the application code or a resource change from a prior invocation. As described previously, the respective monitors identify when changes have occurred by continuously monitoring application code and resources. The notice of a change triggers a request to instance-token generator 316 of FIG. 3 to create a new token.

When a "no" is obtained in step 608, a determination is made as to whether to restart the service (step 612). When a restart is needed, a "yes" is obtained. When no restart is needed, a "no" is obtained. When a "yes" is obtained in step 612, process 600 loops back to step 606 to create a new token. When a "no" is obtained in step 612, the instance-token is provided to the requester (step 614), with process 600 terminating thereafter.

The example just described provides a capability to monitor applications and related resources, as well as startup occurrences to determine when a change in status has occurred. When a change has been determined, a new signature may be generated for the changed component. The signature forms part of the instance-token that may be used to determine whether a change in an application, resource, or timestamp of a respective startup time has occurred. Comparison of a current token with a previous token provides indication or absence of the change in a reliable manner. The monitoring function interacts with the generating service to automate the provision of the instance-token, thereby reducing dependency upon operations or programming staff.

The flowchart and block diagrams in the figures illustrate the architecture, functionality, and operation of possible implementations of systems, methods, and computer program products, according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art, without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for indicating a change in a service offering; the computer-implemented method comprising:

generating a token representative of a state of the service offering including an application and resource, wherein the service offering is between a service provider and a service requester, wherein the token comprising a signature of a compiled code of the application, a signature of the resource used by the application and a timestamp of a last start up of the application, wherein the signature of the compiled code is generated using the timestamp combined with file size of the compiled code, and the signature of the resource is generated using a resource adapter code combined with a timestamp of a time the resource was last modified;

determining whether the service offering has been modified to form a modified service, by monitoring the application and the resource for modifications;

responsive to a determination that the service offering has been modified, generating a token representative of the state of the modified service;

determining whether the service offering has been restarted to form a restarted service, by monitoring the application for a time of the last start up of the application;

responsive to a determination that the offered service has been restarted generating a token representative of the state of the restarted service; and providing the token as a provided token to the service requester, wherein the service requester compares the provided token with a previously provided token to determine whether a change in the service offering exists.

\* \* \* \* \*